United States Patent [19]

McClure

[11] 4,330,408
[45] May 18, 1982

[54] AQUEOUS WASTE TREATMENT

[75] Inventor: Charles A. McClure, Malvern, Pa.

[73] Assignee: Crane Co., New York, N.Y.

[21] Appl. No.: 28,081

[22] Filed: Apr. 9, 1979

[51] Int. Cl.$^3$ .............................................. G02F 3/08
[52] U.S. Cl. .................... 210/619; 210/150;
 261/87; 261/92; 137/625.11; 137/625.15
[58] Field of Search ............... 210/17, 63 R, 150, 151,
 210/199, 278, 424, 425, 246, 392, 220, 221 R,
 221 P, 619, 758; 261/87, 92; 137/580, 625.11,
 625.15, 625.25

[56] References Cited

U.S. PATENT DOCUMENTS

| 2,036,280 | 4/1936 | Knight | 261/92 |
|---|---|---|---|
| 2,278,246 | 3/1942 | Cordova | 137/625.11 |
| 2,998,099 | 8/1961 | Hollingsworth | 261/87 |
| 3,688,905 | 9/1972 | Nordgard | 210/151 |
| 3,773,078 | 11/1973 | Suntheimer | 137/625.11 |
| 3,779,911 | 12/1973 | Freudenthal | 210/151 |
| 3,886,074 | 5/1975 | Prosser | 210/221 R |
| 3,956,127 | 5/1976 | Holmberg | 210/150 |
| 4,093,539 | 6/1978 | Guarino | 210/17 |

FOREIGN PATENT DOCUMENTS 579227 11/1977 U.S.S.R. .............................. 210/150

OTHER PUBLICATIONS

Water and Wastes Engineering, Sep. 1977, Water Pollution Control, special issue, Nelson.

Primary Examiner—Ernest G. Therkorn
Attorney, Agent, or Firm—Charles A. McClure

[57] ABSTRACT

Bio-oxidative treatment of aqueous waste by means of a partially submerged rotating biological contactor (or RBC) is improved by suffusing the rising submerged quadrant of an RBC with air furnished within the RBC perimeter. Air is distributed along and outward from the rotational axis and is released between discs of the RBC. Some of the air so released is trapped by protrusions on the discs. Rotation of such RBC is accomplished or at least aided by differential buoyancy imparted by such air suffusion and trapping.

24 Claims, 7 Drawing Figures

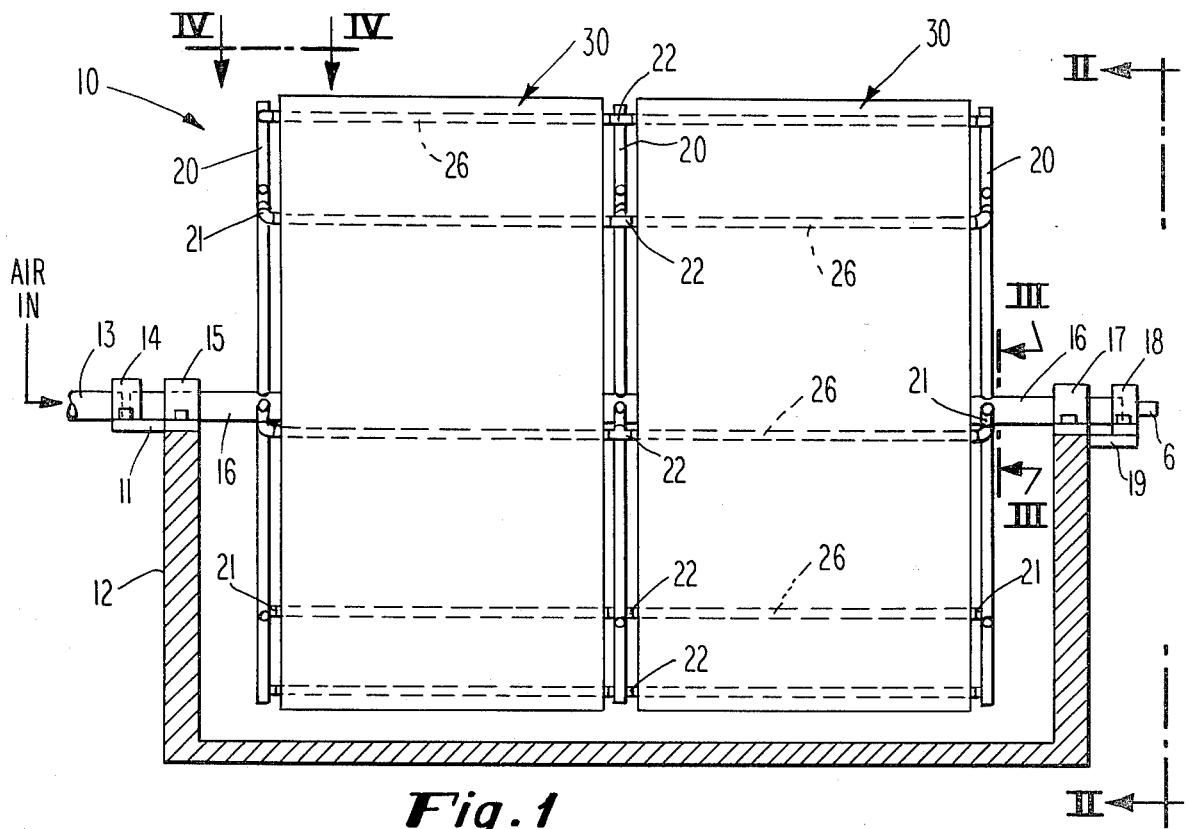
*Fig. 1*
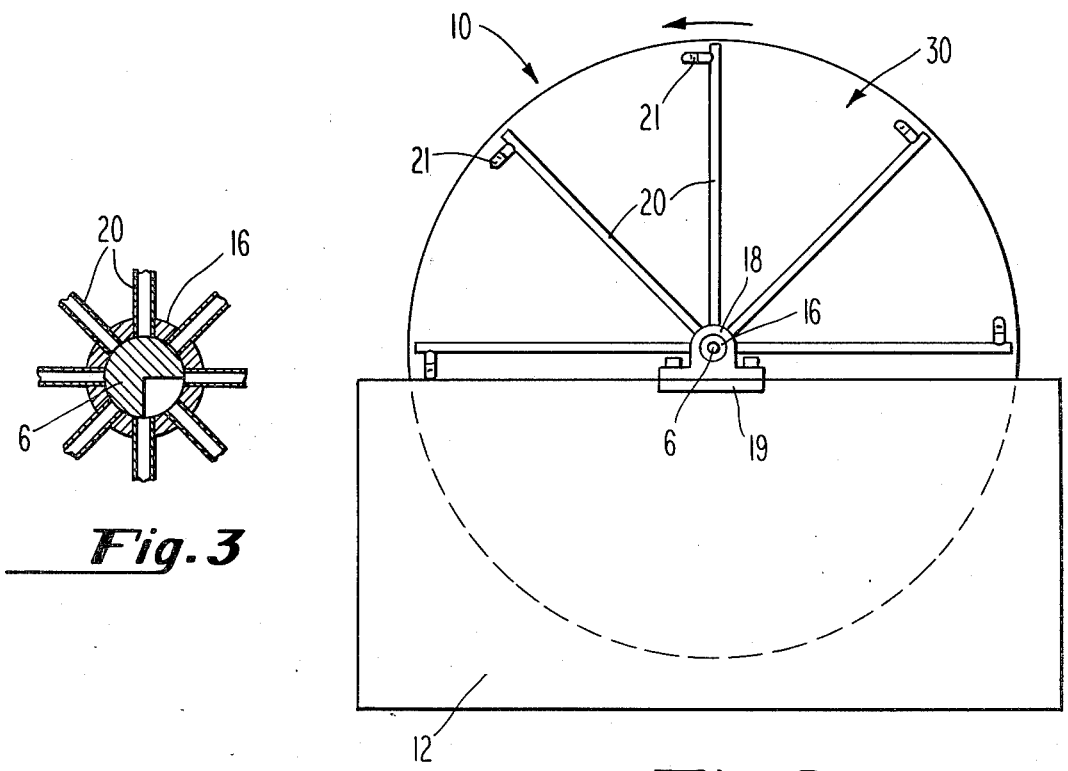
*Fig. 3*
*Fig. 2*

AQUEOUS WASTE TREATMENT

This invention relates to aqueous waste treatment, especially bio-oxidative treatment by means of a rotating biological contactor (RBC) partially submerged in such waste and carrying oxidative microorganisms.

Rotary aeration, and particularly RBC bio-oxidative, methods and apparatus are well known, examples being disclosed in McDonnell U.S. Pat. No. 3,325,154; El-Naggar U.S. Pat. No. 3,335,081; and Gass et al. U.S. Pat. No. 3,827,559. Air drive of an RBC is disclosed in Prosser U.S. Pat. No. 3,886,074. The foregoing patents constitute, insofar as is known to the present inventor and attorney, the prior art most pertinent to the present invention. Aeration of such RBC's is less than optimum and is at best hardly improved by the noted air drive. Existing RBC structures are subject to failure from fatigue and over-stressing.

A primary object of the present invention is provision of auxiliary aeration in RBC aqueous waste treatment.

Another object of this invention is improved air driving of RBC's.

A further object of the invention is combination of both foregoing objects in a single RBC system.

Yet another object is provision of the biomass on an RBC with auxiliary air emitted from locations within the RBC outline.

A still further object is an improved RBC designed to accomplish the foregoing objects.

Other objects of the present invention, together with means and methods for attaining the various objects, will be apparent from the following description and the accompanying diagrams.

FIG. 1 is a side elevation, partly in section, of a form of apparatus embodying this invention;

FIG. 2 is an end elevation of the apparatus of FIG. 1, taken at II—II on that view;

FIG. 3 is a transverse sectional elevation, taken through the axle shaft and spokes at III—III on FIG. 1;

Figure 4:
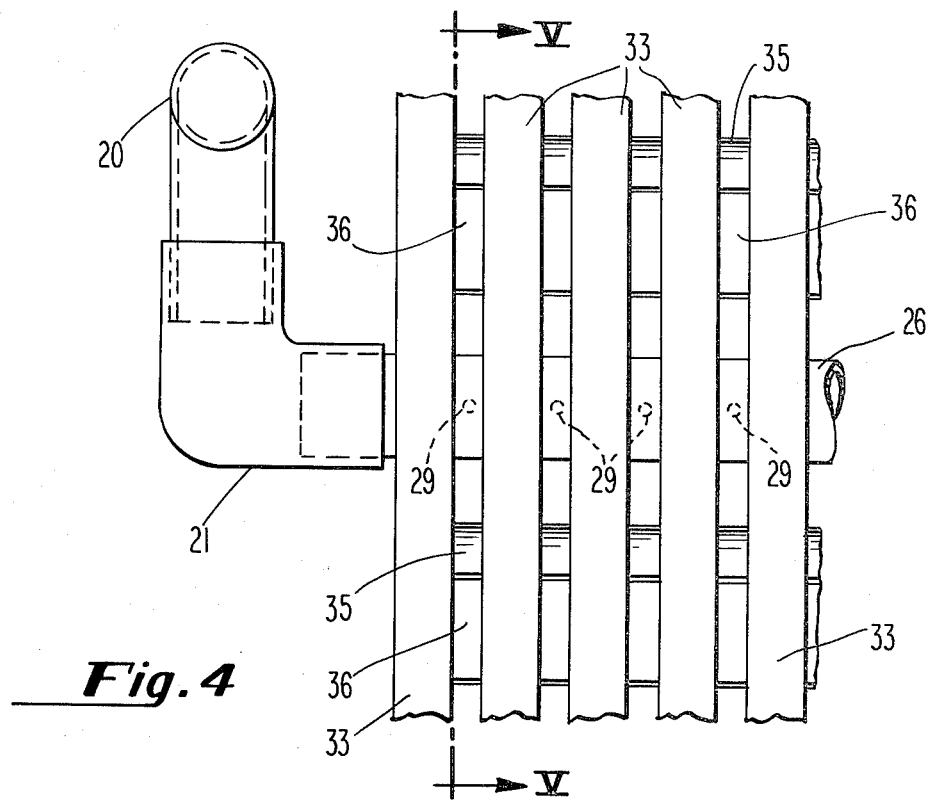
FIG. 4 is an edge elevation greatly enlarged, of a corner portion of the same apparatus, taken at IV—IV on FIG. 1.
Figure 6A:
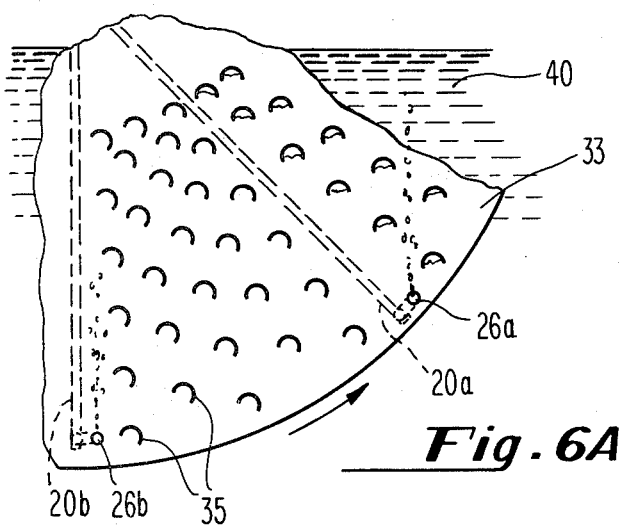
Figure 6B:
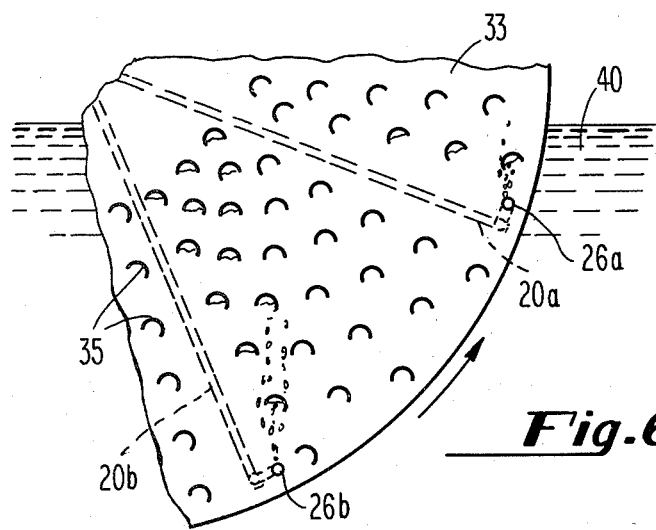
Figure 6C:
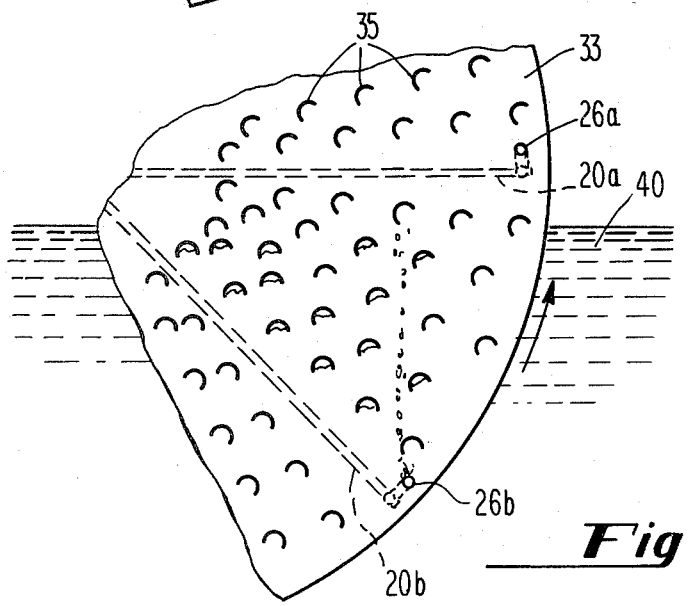
Figure 7:
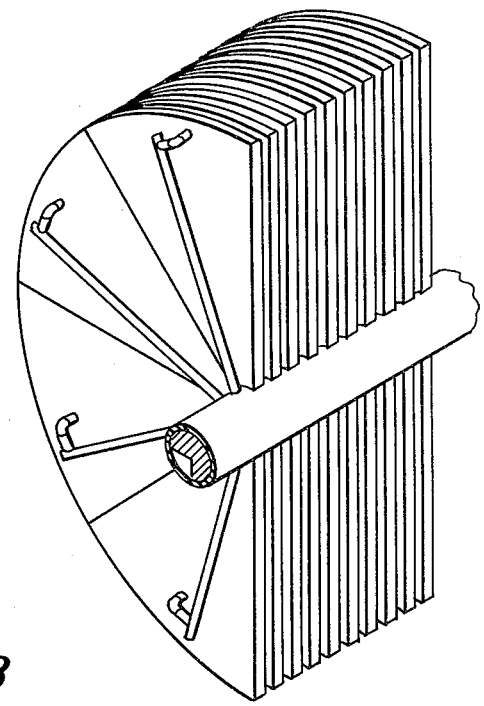

FIGS. 6A, 6B, and 6C are a succession of views, on the original scale, of a disc component face similar to that of FIG. 4, shown submerged but at several successive stages on the upswing; and FIG. 7 is a perspective view of segmented disc components in place.

In general, the objects of this invention, are accomplished, in bio-oxidative treatment of aqueous waste enclosed laterally and below but open to the atmosphere above, as by providing an assemblage of parallel disc-like structures for supporting oxidative microorganisms, spacing the disc-like structures along an axis substantially adjacent and parallel to the atmosphere/aqueous waste interface, and rotating the assemblage of disc-like structures unidirectionally thereabout partly submerged in the aqueous waste and partly emergent into the atmosphere: including applying rotative force to the disc-like structures in the rotational direction and simultaneously aerating the aqueous waste and the supported microorganisms by conducting air along and outward from the axis, releasing it bubble-wise adjacent the portions of the disc-like structures rotatable upward within the aqueous waste, and temporarily trapping some of the air so released within protrusions provided on the disc-like structures.

More particularly, the invention is directed to apparatus for bio-oxidative treatment of aqueous waste wherein an assemblage of generally parallel disc-like structures for supporting oxidative microorganisms is carried by an axle for rotation about a substantially horizontal axis downward into a body of aqueous waste and upward out therefrom and into the atmosphere thereabove, comprising air-conducting means extending along and outward from the axis and terminating within the perimeter of the assemblage in a multiplicity of air outlets, and airflow-controlling valve means for limiting airflow from such outlets to those outlets submerged on the upswing part of the rotation cycle.

FIGS. 1 and 2 show in side and end elevation, respectively, RBC apparatus 10 embodying this invention. Included is tank 12 with journal bearings 15 and 17, on top edges of the tank, supporting horizontal axle shaft 16 at opposite ends and with adjacent similarly shaped clamp assemblies 14 and 18 mounted on respective flanges 11 and 19 extending out from the top edges of the tank for purposes explained below. The axle carries radially extending from it a plurality of spokes 20 in each of a plurality of parallel sets perpendicularly intersecting the axis of the axle. FIG. 1 shows three sets: one near each end of the axle and tank and one located midway thereof. Between each pair of adjacent sets of spokes is an RBC or bio-disc assemblage 30, shown in gross in FIGS. 1 and 2 but comprising disc-like components illustrated in more detail in subsequent views. Near the outer end of each spoke in each end set and offset toward the rotational direction (indicated by an arrow in FIG. 2) is L-fitting 21 interconnecting to stringer 26 extending lengthwise of the apparatus (i.e., parallel to the axis about which the axle rotates). The axle carries the spokes, the stringers, and the bio-disc assemblages. At the intermediate spoke set the stringers extending within adjacent bio-disc assemblages are connected to the spokes by corresponding T-fittings 22. Other supporting hardware is omitted for clarity.

Spokes 20, stringers 26, and interconnecting L-fittings 21 and T-fittings 22 are hollow, as is axle shaft 16, with which the spokes communicate. Clamp assembly 14, at the left in FIG. 1, secures hollow stationary tube 13 in juxtaposition to an end of the axle shaft, which is retained rotatably in the assembly. Such arrangement ensures communication of the hollow tube and axle shaft for air flow therethrough, thence to the spokes and stringers. Clamp assembly 19, at the right in FIG. 1 and also visible in FIG. 2, secures stationary valve rod 6 within the axle shaft, whose opposite end is retained rotatably in the assembly. The valve rod is desegmented at the rising submerged quadrant, as shown in section in FIG. 3, thus permitting air flow through the axle shaft into spokes within that quadrant only. The valve rod is preferably made of or at least coated with synthetic polymeric material characterized by a low coefficient of friction and by sufficient abrasion resistance and structural integrity to withstand rotation of the surrounding axle shaft, which itself is composed of steel or other suitable metal, as are the spokes and the stringers. The tank, also usually metal, may be configured internally to conform to the outline of the bio-disc assemblage, indicated by a broken arcuate line in FIG. 2, to maximize contact of the tank contents with the rotating disc assemblages, which are characterized by extensive surface area for supporting bio-oxidative microorganisms.

Figure 5:
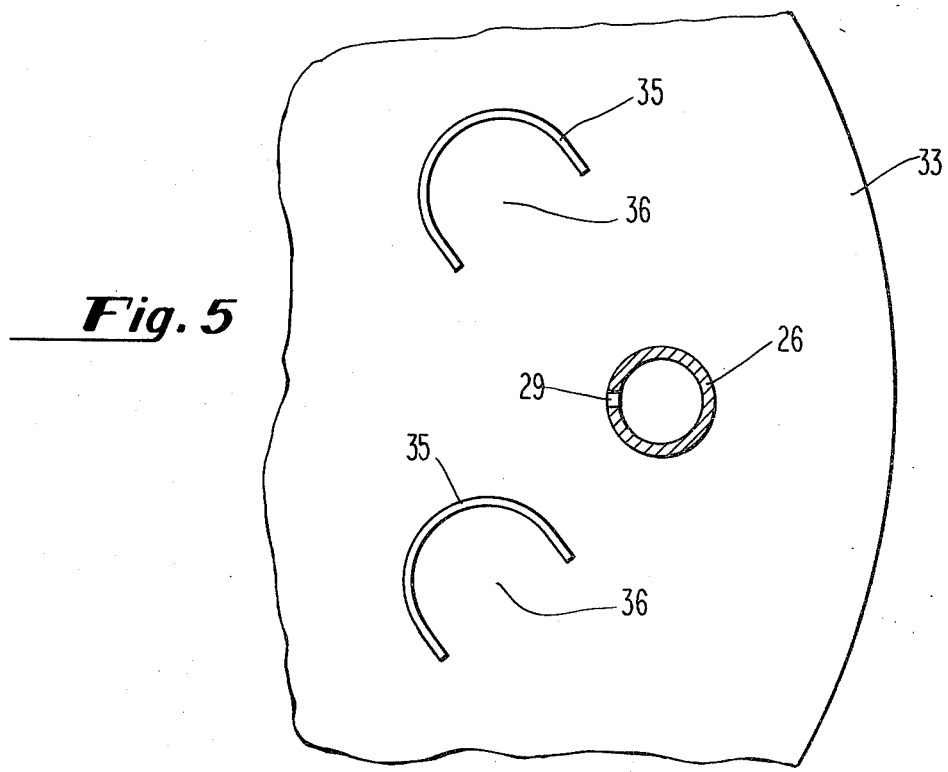
FIG. 5 is a face elevation of a part of a disc component of the apparatus, similarly enlarged, taken at V—V on FIG. 3.

FIG. 4 shows the upper left corner of the apparatus of FIG. 1 in plan, including part of bio-disc assemblage 30, here seen to be made up of a plurality of substantially parallel discs 33 spaced apart perpendicular to and bored to receive stringer 26 therethrough. As shown more clearly in FIG. 5 (sectioned through FIG. 4) the stringer has air outlet openings 29 (shown in broken lines in FIG. 4) oriented inward toward the axis between respective discs. Each disc has generally U-shaped protrusions opening diagonally relative to a radius therethrough and extending into contact with an adjacent disc.

Operation of the illustrated apparatus embodiment is readily understood, especially with the aid of FIGS. 6A, 6B, and 6C, which together show successive stages in rotation of a submerged quadrant on the rise through surrounding aqueous material 40 being treated thereby. Two adjacent spokes 20a and 20b (broken lines) indicate such rotation. Disc 33 has thereon a multiplicity of U-shaped protrusions 35 like those shown on a larger scale in FIG. 5. In FIG. 6A air bubbles are emerging from the air outlet opening in stringer 26a associated with leading spoke 20a, while trailing spoke 20b is about to conduct air to its stringer, as controlled by desegmented valve rod 6 (FIG. 3). Protrusions 35 above (in advance of) spoke 20a have collected air therein, as indicated by short horizontal lines level with the higher lip of all or most of them. The protrusions in the octant between the respective spokes have not had the liquid therein displaced by air as yet.

In FIG. 6B, which represents a rotation through about 20 degrees of arc from the position shown in FIG. 6A, air bubbles are emerging from the outlet opening in stringer 26b associated with trailing spoke 20b and are starting to fill the protrusions above the outlet location. The last protrusion ahead of leading spoke 20a has received bubbles from the associated outlet opening. In FIG. 6C, about 25 degrees later, the leading spoke is horizontal, and air flow to it has been cut off by the valve rod 6, and air bubbles from the stringer outlet associated with the trailing spoke have filled most of the protrusions therebetween. The protrusions that have moved above the liquid surface ahead of the leading spoke are no longer contributing buoyancy, in contrast to those submerged protrusions that are retaining air.

It will be apparent, of course, that the rising quadrant of the bio-disc assemblage is buoyed up by the air trapped in the multiplicity of submerged protrusions. The descending submerged quadrant is not similarly affected. The resulting differential buoyancy tends to rotate the axle shaft and components carried thereby, reducing or entirely eliminating dependence upon any other drive source (e.g., electrical motors and associated gearing). In addition to such rotational effect the present invention provides greatly improved air suffusion of the biomass on the discs, with consequent improvement in the bio-oxidative action of the component microorganisms.

Each disc may be integral (i.e., unitary) and be mounted on the axle shaft and be secured further by the spokes via the stringers or even direct connection (not shown) to the spokes. Alternatively the discs and the assemblages may be segmental in accordance with the spoke spacing (here 45 degrees, although wider or narrower spacing may be employed). Segmented assemblages are generally less subject to structural failure than are integral discs driven at their axial bore boundary by the axle shaft. Additional superstructure (not shown) can help to secure segmented assemblies in place. Offsetting of the spokes and stringers, with interconnecting fittings, aids assembly and especially disassembly, but alternative constructions are obvious, together with their attendant advantages or disadvantages. The illustrated L and T fittings may be assembled with couplings (not shown) to simplify removal. Gravity-operated valves (not shown) within the spokes and/or stringers may supplement or replace the desegmented valve rod, as may be readily visualized.

The discs may have surface convolutions or other configurations not illustrated or described here. Air-trapping protrusions having other than the semicylindrical shapes considered above may supplement or even replace such shapes. Suitable protrusions may be incorporated in all-over patterning of such discs or disc segments. In general their dimensioning should not be so close or fine as to be clogged by the biomass, nor so coarse or large as to sacrifice supporting surface area for the biomass. Spaces and openings less than a couple centimeters or so can be expected to prove troublesome and should be avoided. For light weight and resulting ease of rotation the discs may be composed of synthetic polymeric material, such as polyhydrocarbon. The rotation rate is preferably 1 to 2 rpm.

Although only a single apparatus embodiment has been illustrated and described, some modifications have been suggested and others may come to mind: such as adding, combining, or subdividing parts or steps, or substituting equivalents, while retaining some or all of the advantages and benefits, of this invention, which itself is defined in the following claims.

The claimed invention is:

1. In bio-oxidative treatment of aqueous waste wherein supporting surfaces for oxidative microorganisms are rotated about a substantially horizontal axis extending along the interface between a body of aqueous waste and an overlying atmosphere, the improvement comprising conducting oxidative gas radially outward from the axis and releasing it bubble-wise adjacent the submerged upward-rotating quadrant of such supporting surfaces.

2. In bio-oxidative treatment of aqueous waste wherein supporting surfaces for oxidative microorganisms are rotated about a substantially horizontal axis extending along the interface between a body of aqueous waste and an overlying atmosphere, the improvement comprising conducting oxidative gas longitudinally parallel to the axis inside the perimeter of the microorganism-supporting surfaces and releasing it bubble-wise radially inward adjacent such supporting surfaces underneath the atmosphere/aqueous waste interface.

3. Bio-oxidative waste treatment according to claim 1 or 2, wherein the rotating microorganism-supporting surfaces trap bubbles of oxidative gas so released adjacent such surfaces as they rotate upward underneath the atmosphere/aqueous waste interface, thereby providing rotative force in the rotational direction.

4. Bio-oxidative treatment of aqueous waste enclosed laterally and below but open to the atmosphere above, comprising providing an assemblage of parallel disc-like structures for supporting oxidative microorganisms, spacing the disc-like structures along an axis substantially parallel to and adjacent the atmosphere/aqueous waste interface, and rotating the assemblage of disc-like structures unidirectionally thereabout partly submerged in the aqueous waste and partly emergent into the atmosphere; including applying rotative force to the disc-like structures in the rotational direction and simultaneously aerating the aqueous waste and the supported microorganisms by conducting air along and outward from the axis, releasing it bubble-wise adjacent the portions of the disc-like structures rotatable upward within the aqueous waste, and temporarily trapping some of the air so released within protrusions provided on the disc-like structures inside the perimeter thereof.

5. Bio-oxidative treatment according to claim 4, wherein the disc-like structures are rotatable about the axis solely by the buoyant effect of air so released and trapped.

6. Bio-oxidative treatment according to claim 4, wherein the air is so released and trapped throughout a major radial extent of the disc-like structures when rotating upward within the aqueous waste.

7. Bio-oxidative treatment according to claim 4, including valving the air so distributed for such release only adjacent the rotatively rising submerged portions of the disc-like supporting structures.

8. Bio-oxidative treatment according to claim 4, wherein the air is so released substantially radially inward.

9. In apparatus for bio-oxidative treatment of aqueous waste wherein an assemblage of generally parallel disc-like structures for supporting oxidative microorganisms is carried by an axle for rotation about a substantially horizontal axis downward into a body of aqueous waste and upward out therefrom and into the atmosphere thereabove, the improvement comprising the combination of air-conducting means extending along and outward from the axis and terminating inside the perimeter of the assemblage in a multiplicity of air outlets, and airflow-controlling valve means for limiting airflow from such outlets to those outlets submerged on the upswing part of the rotation cycle.

10. Bio-oxidative apparatus according to claim 9, wherein the axle is hollow and comprises air-conducting means along the axis.

11. Bio-oxidative apparatus according to claim 10, wherein hollow spokes communicating with the axle comprise air-conducting means outward from the axis.

12. Bio-oxidative apparatus according to claim 11, including also hollow tubes extending parallel to the axle and communicating therewith, located within the perimeter of the assemblage and nearer to the perimeter than to the axle itself, and having a multiplicity of air outlets therein.

13. Bio-oxidative apparatus according to claim 11, wherein the disc-like structures are carried at least in part by physical attachment to the spokes.

14. Bio-disc apparatus for bio-oxidative treatment of aqueous waste, comprising a plurality of microorganism-supporting discs spaced along an axle, carried by the axle, and rotatable therewith about a substantially horizontal axis downward into a body of aqueous waste and upward out therefrom and into the atmosphere thereabove; and tubular air-conducting means carried by the axle and rotatable therewith, located within the perimeter of the discs and having a multiplicity of air outlets for releasing air and thereby aerating the adjacent discs and microorganisms supported thereby; the discs comprising protruding means inside the perimeter thereof for trapping air so released and bubbling upward during the upswing thereof while submerged in such aqueous waste.

15. Bio-disc apparatus according to claim 14, wherein the discs are secured to the axle.

16. Bio-disc apparatus according to claim 14, wherein the axle is hollow and is interconnected to the tubular air-conducting means, for flow of air from the axle to the tubular air-conducting means and out from outlets therein.

17. Bio-disc apparatus according to claim 14, including spokes, secured to the axle and wherein the discs are secured to the spokes.

18. Bio-disc apparatus according to claim 17, wherein the discs are segmented.

19. Bio-disc apparatus according to 18, wherein the segments of each disc are secured to a pair of spokes flanking the segments circumferentially.

20. Bio-disc apparatus for bio-oxidative treatment of aqueous waste, comprising an axle, a plurality of microorganism-supporting discs spaced therealong, carried thereby, and rotatable therewith about a substantially horizontal axis downward into a body of aqueous waste and upward out therefrom and into the atmosphere thereabove, the axle being hollow and thereby adapted to conduct air, hollow spokes carried by the axle in communication to receive air therefrom, tubular air-conducting means extending substantially parallel to the axis in communication with the spokes to receive air therefrom, the latter means being located inside the perimeter of the plurality of discs and nearer to that perimeter than to the axis and having a plurality of air outlets directed substantially radially inward to release air from alongside the surfaces between adjacent discs.

21. Bio-disc apparatus according to claim 20, including valve means for limiting the release of air from the outlets to those outlets submerged on the upswing part of the rotation cycle.

22. Bio-disc apparatus according to claim 21, wherein the valve means is located within air-conducting means.

23. Apparatus for bio-oxidative treatment of aqueous waste, comprising an axle, a plurality of microorganism-supporting discs spaced therealong, carried thereby, and rotatable therewith about a substantially horizontal axis downward into a body of aqueous waste and upward out therefrom and into the atmosphere thereabove, the axle being hollow and thereby adapted to conduct air, hollow spokes carried by the axle in communication to receive air therefrom, tubular air-conducting means extending substantially parallel to the axis in communication with the spokes to receive air therefrom, the latter means being located inside the perimeter of the plurality of discs and nearer to that perimeter than to the axis and having a plurality of air outlets directed substantially radially inward to release air from alongside the surfaces between adjacent discs, including also valve means located within the axle and comprising a non-rotating close-fitting member desegmented adjacent the upswing quadrant of the axle.

24. In rotatable biological contactor apparatus for use in treating aqueous waste and having a plurality of discs supported parallel to one another for rotation about their common axle, the improvement comprising protrusions therefrom inside the perimeter thereof adapted to trap rising bubbles of air, when submerged in aqueous waste, such protrusions having a generally concave configuration oriented substantially downward in the lower or submerged upswing quadrant and oriented substantially upward in the lower or submerged downswing quadrant, including means essentially integral therewith comprising hollow tubular members to distribute air for release underneath such protrusions on the submerged upswing, wherein such hollow tubular members include an axle mounting the component discs for rotation about the common axis.

* * * * *